(12) United States Patent
Stein et al.

(10) Patent No.: US 12,715,472 B2
(45) Date of Patent: Aug. 25, 2026

(54) METHOD FOR PRODUCING A SUITABLE DISTANCE BETWEEN AN AUTONOMOUS VEHICLE AND ANOTHER VEHICLE

(71) Applicant: Torc Robotics, Inc., Blacksburg, VA (US)

(72) Inventors: Fridtjof Stein, Ostfildern (DE); Carlo Elwinger, Maulbronn (DE); Chaitra Ashok Reddy, Bietigheim-Bissingen (DE)

(73) Assignee: Torc Robotics, Inc., Blacksburg, VA (US)

( * ) Notice: Subject to any disclaimer, the term of this patent is extended or adjusted under 35 U.S.C. 154(b) by 12 days.

(21) Appl. No.: 18/806,498

(22) Filed: Aug. 15, 2024

(65) Prior Publication Data

US 2025/0058800 A1 Feb. 20, 2025

(51) Int. Cl.
*B60W 60/00* (2020.01)
*G07C 5/02* (2006.01)

(52) U.S. Cl.
CPC ... *B60W 60/0015* (2020.02); *B60W 2420/403* (2013.01); *B60W 2554/4041* (2020.02); *B60W 2554/4044* (2020.02); *B60W 2554/4045* (2020.02); *B60W 2554/4046* (2020.02);
(Continued)

(58) Field of Classification Search
CPC ...... B60W 30/08; B60W 30/09; B60W 30/14; B60W 30/16; B60W 40/09; B60W 60/0015; B60W 60/0018; B60W 60/00186; B60W 2420/403; B60W 2422/90; B60W 2554/40; B60W 2554/4041; B60W 2554/4044; B60W 2554/4045; B60W 2554/4046; B60W 2554/80; B60W 2554/801; B60W 2554/802; B60W 2554/804; B60W 2754/10; B60W 2754/30; G08G 1/16; G08G 1/166; G06V 20/56; G06V 20/58; G06V 20/52; G06V 20/54; G07C 5/02; G07C 5/08; G05D 1/617; G05D 1/622;
(Continued)

(56) References Cited

U.S. PATENT DOCUMENTS

2013/0088343 A1* 4/2013 Deigmoller ............ G08G 1/166
340/436
2013/0100289 A1 4/2013 Arant
2018/0261088 A1* 9/2018 Roy ...................... E01F 15/148
(Continued)

FOREIGN PATENT DOCUMENTS

| | | | |
|---|---|---|---|
| CN | 211001120 | U | 7/2020 |
| EP | 3531393 | A1 | 8/2019 |
| WO | 2018/111082 | A1 | 6/2018 |

*Primary Examiner* — Brandon Z Willis
(74) *Attorney, Agent, or Firm* — McCarter & English, LLP

(57) ABSTRACT

A method for producing a suitable distance between an autonomous vehicle and a second vehicle. The method includes recording data of an environment including the second vehicle driving ahead of the autonomous vehicle along a direction of travel, the data being recorded by a sensor system positioned relative to the autonomous vehicle in the direction of travel and in communication with a computing unit. The method includes detecting a potentially dangerous situation by the sensor system based on a distance between the autonomous vehicle and the second vehicle. The method includes adjusting the autonomous vehicle to maintain the suitable between the autonomous vehicle and the second vehicle.

17 Claims, 3 Drawing Sheets

(52) U.S. Cl.
CPC ... *B60W 2554/802* (2020.02); *B60W 2754/30* (2020.02); *G07C 5/02* (2013.01)

(58) Field of Classification Search
CPC .. B60T 7/12; B60T 2201/02; B60T 2201/022; B60T 2220/02; G06T 7/0002
See application file for complete search history.

(56) References Cited

U.S. PATENT DOCUMENTS

| | | | | |
|---|---|---|---|---|
| 2019/0329772 | A1* | 10/2019 | Graves | B60W 30/16 |
| 2020/0004242 | A1* | 1/2020 | Kim | B60W 30/146 |
| 2021/0245739 | A1* | 8/2021 | Verburg | B60W 50/08 |
| 2021/0280060 | A1* | 9/2021 | Rider | G08G 1/164 |
| 2021/0387617 | A1* | 12/2021 | Bauch | G06V 20/58 |
| 2023/0106673 | A1* | 4/2023 | Asghar | A61B 5/4809<br>382/104 |
| 2024/0124025 | A1* | 4/2024 | Kim | B60W 60/0016 |
| 2024/0239375 | A1* | 7/2024 | Kuehner | B60H 1/00849 |

* cited by examiner 17
18
3
9
13
15
12
14
11
16
10
9
3
4

METHOD FOR PRODUCING A SUITABLE DISTANCE BETWEEN AN AUTONOMOUS VEHICLE AND ANOTHER VEHICLE

CROSS-REFERENCE TO RELATED APPLICATIONS

This application claims priority to DE Patent Application No. 102023121945, filed Aug. 16, 2023, and titled "AUTONOMOUS TRUCKS-DEALING WITH BRAKE CHECKING", which is hereby incorporated by reference in its entirety.

BACKGROUND

The field of disclosure relates to a method for producing a suitable distance between an autonomous vehicle and another vehicle.

Heavy braking (brake checking) of a leading vehicle at a short distance in front of a following vehicle, possibly after the vehicle in front has pulled into the safety distance of the following vehicle, is a dangerous behavior that can lead to rear-end collisions. In these cases, the driver of the following vehicle is often blamed for the accident, which has safety and financial consequences. In some cases, the driver of the leading vehicle may stop the vehicle short to intentionally or unintentionally cause an accident. With the increasing occurrence of autonomous vehicles, such as commercial vehicles, an increase in such cases can be expected.

EP 3 531 393 A1 describes a method and a vehicle lamp for detecting evidence when a distance between successive vehicles falls below a safety distance, one's own vehicle and at least one other vehicle in its surroundings and/or environment. The method comprises measuring a distance from one's own vehicle to another vehicle, wherein if a predetermined minimum distance and/or a safety distance proportional to the minimum distance is undershot by comparing the measured distance with a distance threshold value, capturing and at least temporary storing of one or more images is activated, which images refer to at least that part of the environment and/or the surroundings of one's own vehicle, in which the other vehicle is located, the measured distance of which from one's own vehicle is below the distance threshold value. The vehicle light comprises a light housing and at least one lens, which at least partially surround a light interior, at least one lamp at least partially housed in the light interior with at least one light source for performing at least one lighting function, at least one camera directed at an environment facing away from the light housing and at least partially housed in at least one part of the light interior, storage means connected to the camera for storing at least images of the environment captured by the camera, means for detecting a distance to another vehicle in the environment of the vehicle light visible to the camera, and means connected to the means for measuring the distance for comparing the measured distance with a distance threshold value, wherein the means for comparing are connected to the camera and/or the storage means in such a way that they trigger a recording of images of the environment by the camera and/or a storing of the images of the environment captured by the camera if the result of the comparison is that the measured distance is smaller than the distance threshold value.

Thus, it is desirable to provide a method for producing a suitable distance between an autonomous vehicle and another vehicle.

BRIEF DESCRIPTION

In one aspect, a method for producing a suitable distance between an autonomous vehicle and a second vehicle. The method includes recording data of an environment including the second vehicle driving ahead of the autonomous vehicle along a direction of travel, the data being recorded by a sensor system positioned relative to the autonomous vehicle in the direction of travel in front of the autonomous vehicle and in communication with a computing unit. The method includes detecting a potentially dangerous situation by the sensor system based on a distance between the autonomous vehicle and the second vehicle. The method includes adjusting the autonomous vehicle to maintain the suitable between the autonomous vehicle and the second vehicle.

In another aspect, a method for producing a suitable distance between an autonomous vehicle and a second vehicle. The method includes recording data of an environment including the second vehicle driving ahead of the autonomous vehicle along a direction of travel, the data being recorded by a sensor system positioned relative to the autonomous vehicle in the direction of travel in front of the autonomous vehicle and in communication with a computing unit. The method includes detecting a potentially dangerous situation by the sensor system based on a distance between the autonomous vehicle and the second vehicle, and analyzing if the second vehicle is a low-quality vehicle by examining a body of the second vehicle for existing damage. The method includes adjusting the autonomous vehicle to maintain the suitable between the autonomous vehicle and the second vehicle.

In another aspect, a method for producing a suitable distance between an autonomous vehicle and a second vehicle. The method includes recording data of an environment including the second vehicle driving ahead of the autonomous vehicle along a direction of travel, the data being recorded by a sensor system positioned relative to the autonomous vehicle in the direction of travel in front of the autonomous vehicle and in communication with a computing unit. The method includes detecting a potentially dangerous situation by the sensor system based on a distance between the autonomous vehicle and the second vehicle, wherein the potentially dangerous situation is selected from the group consisting of erratic driving behavior of the second vehicle, heavy braking of the second vehicle, a low-quality second vehicle identified by examining a body of the second vehicle, and combinations thereof. The method includes adjusting the autonomous vehicle to maintain the suitable between the autonomous vehicle and the second vehicle.

The solution according to the present disclosure detects potentially dangerous situations caused by heavy braking (brake checking) so that defensive measures can be taken. Furthermore, legally relevant data can be collected before a potential collision. If the solution according to the present disclosure becomes known, this may result in vehicles, in particular autonomous or manually operated commercial vehicles, being slowed down less frequently due to the increased legal risks.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

In particular.

Corresponding parts are provided with the same reference numerals in all figures.

DETAILED DESCRIPTION

Figure 1:
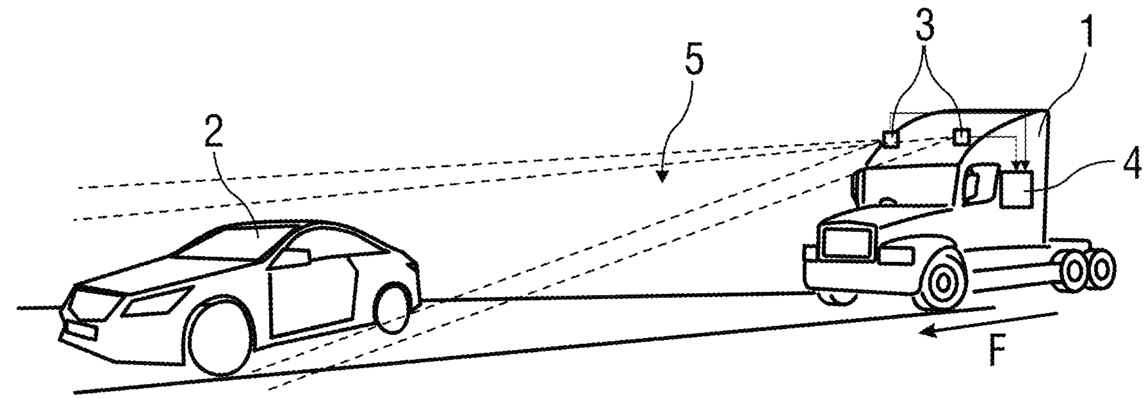
FIG. 1 is a schematic view of a traffic situation with an autonomous vehicle and a vehicle driving ahead.

FIG. 1 is a schematic view of a traffic situation with an autonomous vehicle and a vehicle driving ahead 2. The autonomous vehicle 1 is equipped with a sensor system 3 for detecting an environment, in particular in a direction of travel F in front of the autonomous vehicle 1, within a detection cone 5 of the sensor system 3. The sensor system 3 can, for example, comprise at least one camera, at least one LIDAR sensor and/or at least one radar sensor. In the embodiment shown, the sensor system 3 has at least one stereo camera 3, which is connected to an electronic computing unit 4. The sensor system 3 of the autonomous vehicle 1 detects the vehicle 2 driving ahead in FIG. 1.

The autonomous vehicle 1 can, for example, be designed as a commercial vehicle, bus or passenger car. Furthermore, the autonomous vehicle 1 can be designed as a fully autonomous or semi-autonomous vehicle.

If the sensor system 3 and/or the computing unit 4 detects a potentially dangerous situation caused by heavy braking (brake checking) of the vehicle 2 driving ahead, the computing unit 4 prepares for a post-collision data analysis. This determines whether the vehicle 2 driving ahead is a severely impaired vehicle 2 (e.g., a previously damaged vehicle). Such vehicles may be more likely to intentionally or unintentionally cause an accident.

According to the present disclosure, a detection of a potentially dangerous situation caused by heavy braking is proposed. In the process, other road users, such as the vehicle 2 driving ahead, are detected for exhibiting erratic driving behavior. The erratic behavior of vehicle 2 may cause the vehicle 2 to move into the safety distance of the autonomous vehicle 1. In some instances, the driving behavior of vehicle 2 may be ignored. In other instances, adjustment of the autonomous vehicle 1 may be required to maintain a suitable distance between the autonomous vehicle 1 and the vehicle 2. Furthermore, data collected by the sensor system 3 are used to evaluate the quality of the vehicle 2 driving ahead, whereby a vehicle 2 of poor quality is assessed as a higher risk of attempted insurance fraud and therefore greater caution is required.

The assessment of the quality of the vehicle 2 driving ahead can be carried out using stereo image data from the stereo camera 3, with which the vehicle 2 driving ahead, in particular its body, can be measured as precisely as possible and examined for dents 6 and other damage 6.

Figure 2:
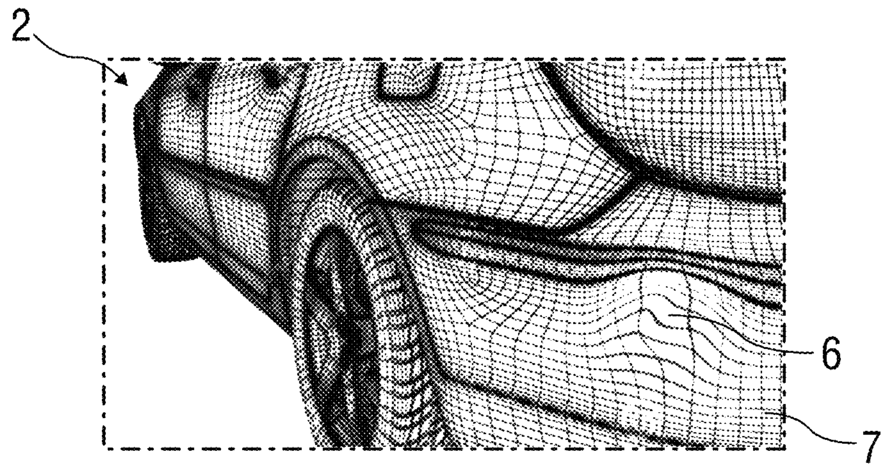
FIG. 2 is a schematic detailed view of the vehicle with a dent on a bumper.
Figure 3:
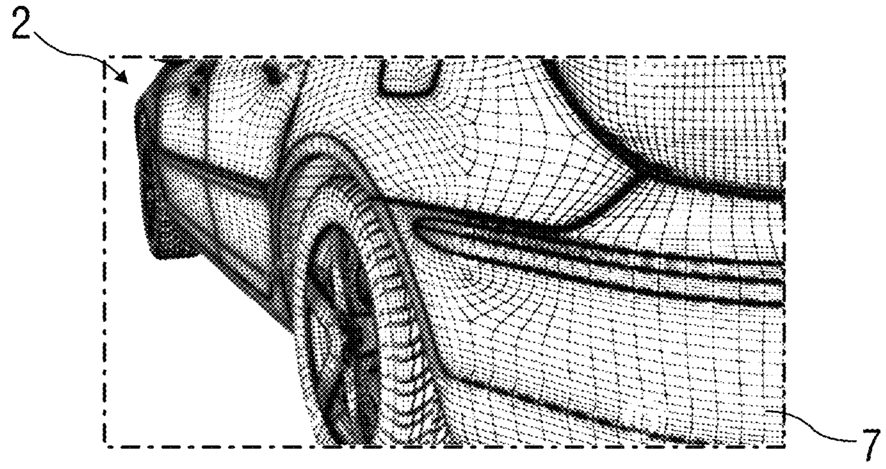
FIG. 3 is a schematic detailed view of a vehicle without dent for comparison.

FIG. 2 is a schematic detailed view of the vehicle 2 with a dent 6 on a bumper 7. FIG. 3 is a schematic detailed view of a vehicle 2 without dent 6 for comparison.

Furthermore, the image data can be examined for color changes and rust spots to evaluate the quality of the vehicle driving ahead 2.

Figure 4:
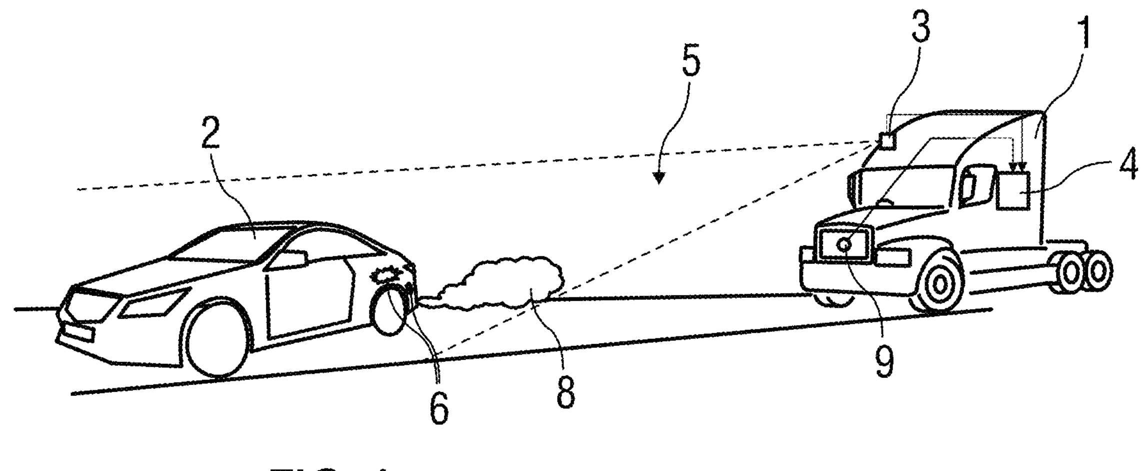
FIG. 4 is a schematic view of a traffic situation with an autonomous vehicle and a vehicle driving ahead with damage to the bodywork and clearly visible exhaust emissions.

FIG. 4 is a schematic view of a traffic situation with an autonomous vehicle 1 and a vehicle driving ahead 2 with damage 6 to the bodywork and clearly visible exhaust emissions 8.

To evaluate the quality of the vehicle 2 driving ahead, the image data can be examined for increased exhaust emissions 8 from the vehicle 2 driving ahead, which may indicate a defective engine. Damage 6 such as rust spots, repainted surfaces and/or unusual exhaust emissions 8 can be detected by image processing.

Alternatively or additionally, an air gas sensor 9 can be used to analyze the air quality. Furthermore, the movement of the vehicle driving ahead 2 can be tracked in order to detect trajectories and movement patterns that indicate mechanical defects, for example defective shock absorbers.

If a potentially dangerous situation caused by heavy braking has been detected with a high probability, then a behavior planning module 12 of the autonomous vehicle 1 can transfer into a state of high, increased or maximum defensive driving style with respect to the vehicle 2 driving ahead.

All sensor data may be permanently recorded in this case to enable detailed analysis after a collision.

If a potentially dangerous situation due to heavy braking was not detected or was only detected with low probability, or if the previously detected potentially dangerous situation is no longer detected after some time, normal driving can be resumed.

The measurements of all sensors can be recorded in a ring buffer 18 in order to be able to analyze the data after the collision. In the event of an accident, the data stored in the ring buffer 18 can be saved permanently.

In case of a lack of storage, several recording levels with different qualities can be provided for recording the data of several sensors, for example ten minutes of video only in low quality and one minute of data from all sensors in high quality in the ring buffer 18.

The stereo camera 3 is used to precisely measure the body of the vehicle 2 driving ahead. Stereo cameras 3 are used in commercial vehicles for the purpose of looking far ahead, typically with a high base width and high resolution. This combination enables good measurements over large distances, but also enables particularly accurate measurements in the vicinity of the autonomous vehicle 1. This enables accurate modeling of the immediate environment as shown in FIGS. 2 and 3.

In some instances, if the vehicle 2 driving ahead claims damages 6 that allegedly resulted from the collision, the data from the measurement of the vehicle 2 driving ahead using the sensors 3 of the autonomous vehicle 1 before the collision can easily prove that these damages 6 already existed before the collision.

Furthermore, it can be provided that sideways and rearwards directed sensors on the autonomous vehicle 1 detect overtaking vehicles 2 during the overtaking maneuver before they possibly pull in, in front of the autonomous vehicle 1 in order to obtain a more complete picture of the quality of the vehicle 2 driving ahead.

Figure 5:
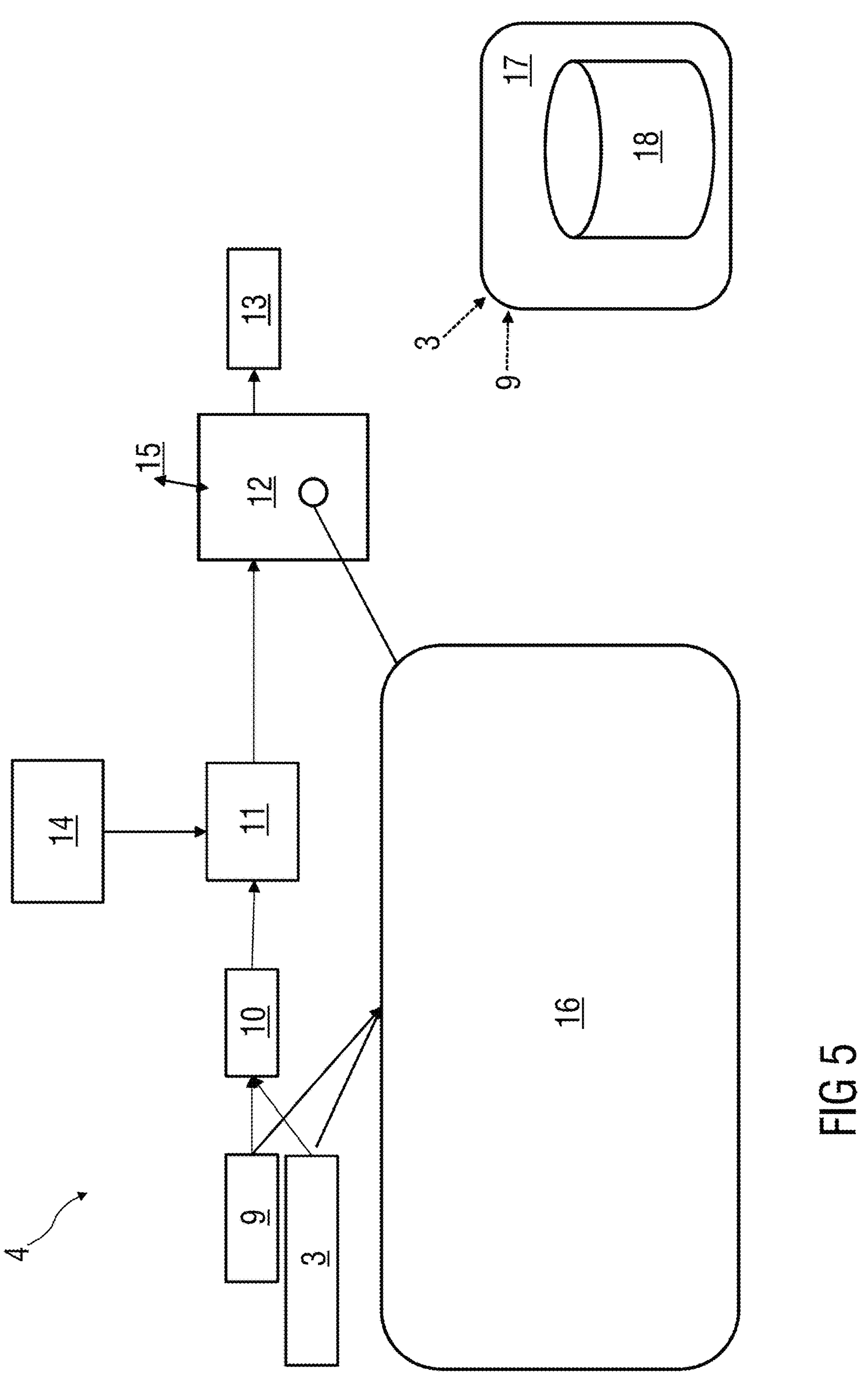
FIG. 5 is a schematic view of an exemplary processing chain of the autonomous vehicle.

FIG. 5 is a schematic view of an exemplary processing chain of the autonomous vehicle 1. Environmental data is detected by the sensors 3 and fed to the computing unit 4. In the computing unit 4, the data from the sensor system 3 are fused in a fusion unit 10 and compared and localized with an internal digital map 11. The fused data from the fusion unit 10 are fed to a behavior planning module 12. The behavior planning module 12 is configured to control an actuator 13 of the autonomous vehicle 1 for steering, accelerator and brake.

The digital map 11 can be connected to a satellite navigation system 14.

The behavior planning module 12 can further communicate with a backend via an interface 15, in particular wirelessly.

The computing unit 4 further comprises a defensive behavior module 16, to which the data from the sensor system 3 and, if applicable, the air gas sensor system 9 are made available. The defensive behavior module 16 is configured to evaluate the quality of the vehicle driving ahead 2, to measure the body of the vehicle driving ahead 2 and to track other road users, in particular of the vehicle driving ahead 2, and based thereon to detect a potentially dangerous situation due to heavy braking, and provides data for the behavior planning module 12 in order to initiate a defensive driving style if a potentially dangerous situation due to heavy braking has been detected at least with a high degree of probability.

Furthermore, a post-accident analysis module 17 with a ring buffer 18 is shown, in which data from the sensor system 3 and, if applicable, the air gas sensor system 9 are stored.

The invention claimed is:

1. A method for producing a suitable distance between an autonomous vehicle and a second vehicle, the method comprising:

recording data of an environment including the second vehicle driving ahead of the autonomous vehicle along a direction of travel, the data being recorded by a sensor system positioned relative to the autonomous vehicle in the direction of travel in front of the autonomous vehicle and in communication with a computing unit;

detecting a potentially dangerous situation by the sensor system based on a distance between the autonomous vehicle and the second vehicle; and adjusting the autonomous vehicle to maintain the suitable distance between the autonomous vehicle and the second vehicle, wherein the movement of the second vehicle is monitored using the data to identify trajectories and movement patterns that indicate mechanical defects.

2. The method according to claim 1, wherein the potentially dangerous situation is selected from the group consisting of erratic driving behavior of the second vehicle, heavy braking of the second vehicle, and combinations thereof.

3. The method according to claim 2, wherein detecting the potentially dangerous situation further comprises analyzing the data of the second vehicle to determine if the second vehicle is a impaired vehicle by examining a body of the second vehicle.

4. The method according to claim 3, wherein analyzing the data for evaluating the quality of the second vehicle is examined for having an exhaust emissions above a predetermined threshold.

5. The method according to claim 4, wherein an air gas sensor system is used to analyze the air quality surrounding an exhaust of the second vehicle in order to evaluate a quality of the second vehicle.

6. The method according to claim 1, wherein the data is stored in a ring buffer that is stored permanently in the event of a collision.

7. The method according to claim 1, wherein the sensor system includes at least one stereo camera.

8. The method according to claim 1, wherein the autonomous vehicle further comprises a sensor configured to record data of an overtaking vehicle before the overtaking vehicle moves in front of the autonomous vehicle.

9. A method for producing a suitable distance between an autonomous vehicle and a second vehicle, the method comprising:

recording data of an environment including the second vehicle driving ahead of the autonomous vehicle along a direction of travel, the data being recorded by a sensor system positioned relative to the autonomous vehicle in the direction of travel in front of the autonomous vehicle and in communication with a computing unit;

detecting a potentially dangerous situation by the sensor system based on a distance between the autonomous vehicle and the second vehicle, and analyzing if the second vehicle is a impaired vehicle by examining a body of the second vehicle for existing damage; and adjusting the autonomous vehicle to maintain the suitable between the autonomous vehicle and the second vehicle, wherein the movement of the second vehicle is monitored using the data to identify trajectories and movement patterns that indicate mechanical defects.

10. The method according to claim 9, wherein the potentially dangerous situation is selected from the group consisting of erratic driving behavior of the second vehicle, heavy braking of the second vehicle, and combinations thereof.

11. The method according to claim 9, wherein the data is stored in a ring buffer that is stored permanently in the event of a collision.

12. The method according to claim 9, wherein the sensor system includes at least one stereo camera.

13. The method according to claim 9, wherein analyzing the data for evaluating the quality of the second vehicle is examined for having an exhaust emissions above a predetermined threshold.

14. The method according to claim 9, wherein an air gas sensor system is used to analyze the air quality surrounding an exhaust of the second vehicle in order to evaluate a quality of the second vehicle.

15. The method according to claim 9, wherein the autonomous vehicle further comprises a sensor configured to record data of an overtaking vehicle before the overtaking vehicle moves in front of the autonomous vehicle.

16. A method for producing a suitable distance between an autonomous vehicle and a second vehicle, the method comprising:

recording data of an environment including the second vehicle driving ahead of the autonomous vehicle along a direction of travel, the data being recorded by a sensor system positioned relative to the autonomous vehicle in the direction of travel in front of the autonomous vehicle and in communication with a computing unit;

detecting a potentially dangerous situation by the sensor system based on a distance between the autonomous vehicle and the second vehicle, wherein the potentially dangerous situation is selected from the group consisting of erratic driving behavior of the second vehicle, heavy braking of the second vehicle, a impaired second vehicle identified by examining a body of the second vehicle, and combinations thereof; and adjusting the autonomous vehicle to maintain the suitable between the autonomous vehicle and the second vehicle, wherein the movement of the second vehicle is monitored using the data to identify trajectories and movement patterns that indicate mechanical defects.

17. The method according to claim 16, wherein the autonomous vehicle further comprises a sensor configured to record data of an overtaking vehicle before the overtaking vehicle moves in front of the autonomous vehicle.

* * * * *